April 19, 1927. 1,624,988

K. SIECKMANN

CRANE

Filed Nov. 17, 1925  2 Sheets-Sheet 1

INVENTOR
Karl Sieckmann
BY S. Sorral.
ATTORNEY

April 19, 1927.  K. SIECKMANN  1,624,988
CRANE
Filed Nov. 17, 1926  2 Sheets-Sheet 2

INVENTOR
Karl Sieckmann
BY S. Soral.
ATTORNEY

Patented Apr. 19, 1927.

1,624,988

UNITED STATES PATENT OFFICE.

KARL SIECKMANN, OF VIENENBURG, GERMANY.

CRANE.

Application filed November 17, 1926, Serial No. 148,944, and in Germany November 16, 1925.

The present invention relates to an improved method of handling trunks, boles, beams and like timber stacked in a timber yard and to an improved crane for carrying out the said method.

It is, at present, usual to transport a trunk, bole or beam stacked in a timber yard to a cutting off saw for the purpose of cutting off one or both ends of the trunk or cutting the trunk to the required length, then transport the trunk to a frame saw for the purpose of cutting same longitudinally into boards or the like and re-transporting the cut off end or ends of the trunk to the timber yard.

The object of the present invention is to dispense with the transporting of the trunk, bole or like timber to the cutting off saw and re-transporting the cut off ends of the trunk or like timber to the timber yard.

With this object in view, the trunk, bole or like timber is cut to the required length whilst remaining in its position in the timber yard and on the stack, and is then transported to the frame saw or any other point of further employment. For this purpose the trunk whilst lying in the timber yard on the stack is lifted by means of the hoisting gear of a crab or trolley of the usual travelling crane, and is cut to length by means of a cutting off saw mounted upon the crane either upon the same crab or a separate crab. The cutting off saw is vertically adjustable so that it may be lowered or raised as required.

The trunk or other article of timber is securely held by the hoisting gear of the crab during the cutting off operation so that the usual yoke supports employed during the cutting off operation may be dispensed with. After the trunk or other article of timber has thus been cut to length, it is transported directly to the frame saw or any other distant point of use by the crane. It will thus be seen that the cut off end or ends of the trunk remain in the timber yard and that the hitherto necessary step of transporting the trunk to the cutting off saw for the purpose of cutting the trunk to the required length is entirely dispensed with.

The accompanying drawings show two constructions of cranes suitable for carrying out the invention.

Figure 1:
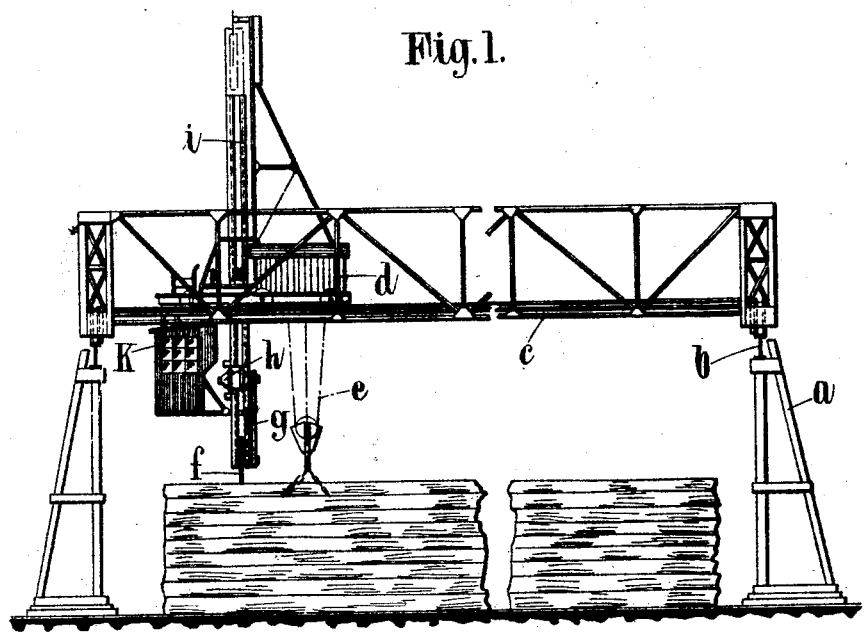
Fig. 1 shows the first construction in elevation.
Figure 2:
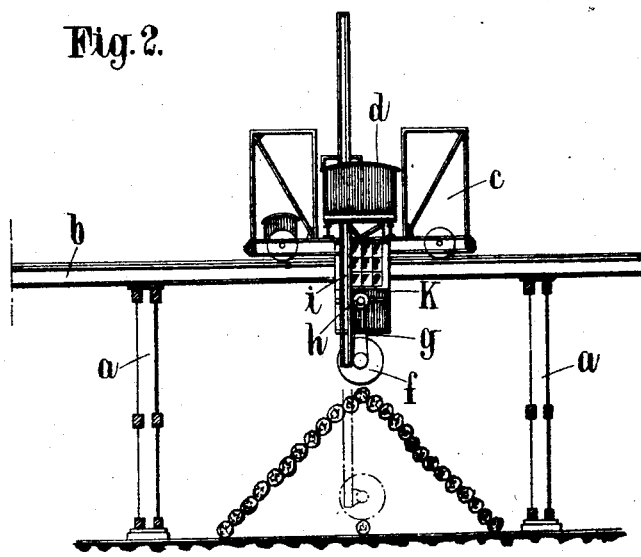
Fig. 2 is a side view of the first construction.

Referring first to Figs. 1 and 2 a travelling crane $c$ is supported by two track rails $b$ running in the longitudinal direction of the timber yard and supported by columns $a$. The crane is provided with a crab $d$ carrying a hoisting gear $e$ and a cutting off saw. The cutting off saw comprises a circular saw $f$, a belt drive $g$ and an electro-motor $h$ and is vertically adjustable in a guide $i$ in which it may be moved up and down by means of a hoisting gear mounted on the crab and adapted to be controlled from a driver's cage $k$ built on the crab $d$.

After a trunk has been raised from the stack by means of the hoisting gear $e$ of the crab $d$ the cutting off saw $f$ is brought to the cutting point of the trunk and the trunk is then cut to the required length. The trunk cut to the required length is then transported directly by means of the travelling crane $c$ to the saw frame or other point of use.

In this construction the hoisting gear $e$ and the cutting off saw may be adjustably munted upon the running crab $d$ so that the distance between the hoisting gear $e$ and the cutting off saw may be regulated as required. Either the cutting off saw or the hoisting gear $e$ or both may be adjustably mounted upon the crab $d$.

Figure 3:
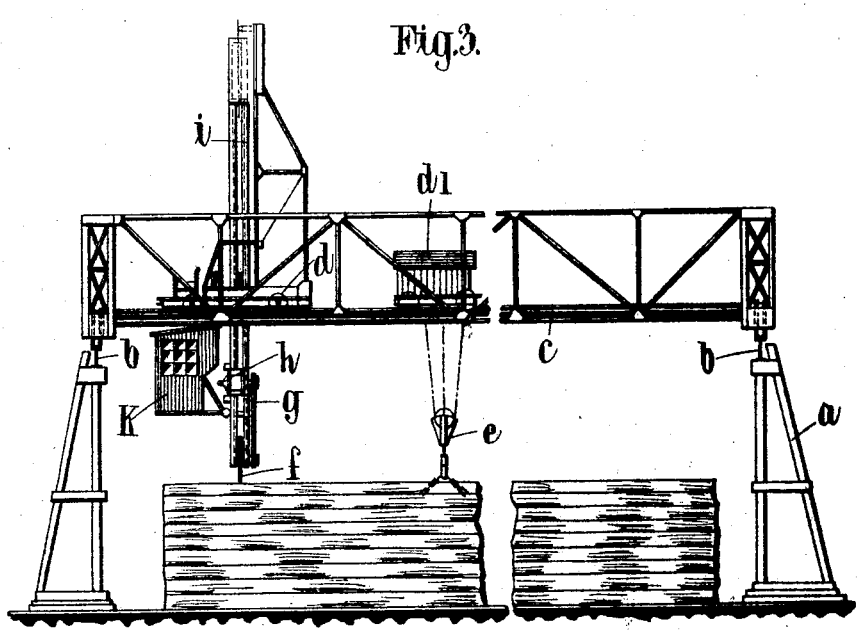
Fig. 3 shows the second construction in elevation.
Figure 4:
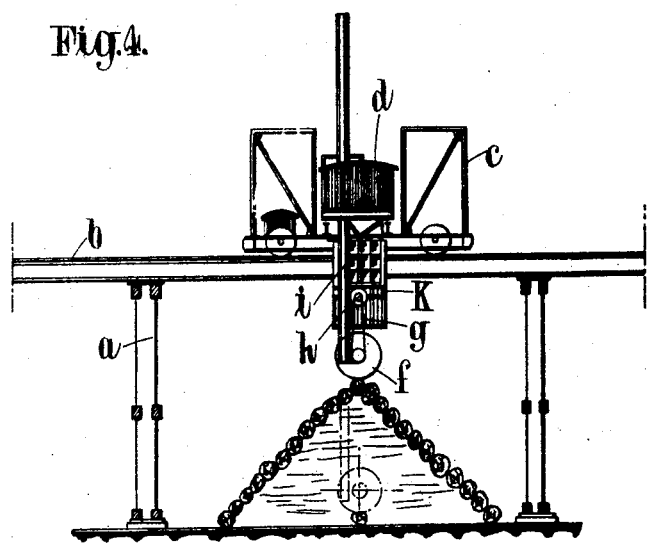
Fig. 4 is an end view of the second construction.

In the construction shown in Figs. 3 and 4 the hoisting gear $e$ for lifting a trunk or other timber is mounted on a crab $d'$, and the cutting off saw $f$, $g$, $h$ is mounted in a separated or independent crab $d$. As in the previous case the cutting off saw $f$, $g$, $h$ is vertically adjustable in a guide way $i$ by means of a hoisting gear controlled from a driver's cage built upon the crab $d$. This construction has certain advantages over the construction shown in Figs. 1 and 2 inasmuch as the distance between the hoisting gear $e$ for lifting the trunk and the cutting off saw may be adjusted or varied within wider limits.

It will be understood that instead of the hoisting gear shown in the drawings any other hoisting gear may be used, for instance, the hoisting gear may consist of one or more rigid arms adjustable in suitable guideways and provided with means for gripping the trunk. Such an arrangement has the advantage of entirely preventing any oscillation of the trunk during the cutting off operation.

I claim:

1. A travelling crane for handling stacked timber comprising a horizontally movable hoisting gear for lifting the timber and a vertically adjustable cutting-off saw for cutting the timber to length.

2. A travelling crane for handling stacked timber, comprising a hoisting gear for lifting the timber and a horizontally and vertically adjustable cutting-off saw for cutting the timber to length.

3. A travelling crane for handling stacked timber, comprising: a horizontally movable hoisting gear for lifting the timber, and a horizontally and vertically adjustable cutting-off saw for cutting the timber to length.

4. A travelling crane for handling stacked timber, comprising a horizontally movable hoisting gear for lifting the timber, and a horizontally and vertically adjustable cutting-off saw for cutting the timber to length, said hoisting gear and said cutting off saw being independently movable upon the crane in the horizontal direction.

5. A travelling crane for handling stacked timber, comprising a horizontally movable hoisting gear for lifting the timber, and a vertically adjustable cutting-off saw for cutting the timber to length, said saw comprising a circular saw, an electro-motor and a belt drive.

6. A travelling crane for handling stacked timber comprising a crab, a hoisting gear for lifting the timber, mounted on said crab, a second crab, and a cutting-off saw adjustable in the vertical direction on the said second crab.

In testimony whereof I have signed my name to this specification.

KARL SIECKMANN.